United States Patent
McLeod et al.

(10) Patent No.: US 8,436,908 B2
(45) Date of Patent: May 7, 2013

(54) OPTICAL IMAGE STABILIZATION

(75) Inventors: Stuart McLeod, Lothian (GB); Ewan Findlay, Dollar (GB)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 367 days.

(21) Appl. No.: 12/948,430

(22) Filed: Nov. 17, 2010

(65) Prior Publication Data

US 2011/0115926 A1    May 19, 2011

(30) Foreign Application Priority Data

Nov. 18, 2009 (GB) .................................. 0920191.4

(51) Int. Cl.
*H04N 5/228* (2006.01)

(52) U.S. Cl.
USPC ................. 348/208.7; 348/208.2; 348/208.3; 348/208.12

(58) Field of Classification Search ............ 348/207.99, 348/208.99, 208.1, 208.2, 208.3, 208.4, 208.7, 348/208.11, 208.12
See application file for complete search history.

(56) References Cited

U.S. PATENT DOCUMENTS

| | | | |
|---|---|---|---|
| 6,233,009 B1 * | 5/2001 | Morofuji et al. | 348/208.8 |
| 6,982,746 B1 | 1/2006 | Kawahara | 348/208.99 |
| 7,209,165 B2 * | 4/2007 | Ishikawa | 348/208.99 |
| 7,486,879 B2 * | 2/2009 | Moriya et al. | 396/53 |
| 7,932,926 B2 * | 4/2011 | Tomita et al. | 348/208.4 |
| 8,089,517 B2 * | 1/2012 | Nagata et al. | 348/208.2 |
| 8,199,206 B2 * | 6/2012 | Tabuchi | 348/208.99 |
| 8,259,183 B2 * | 9/2012 | Tomita et al. | 348/208.4 |
| 2002/0027599 A1 | 3/2002 | Yamazaki | 348/208 |
| 2002/0047906 A1 | 4/2002 | Ohta | 348/208 |
| 2004/0056963 A1 * | 3/2004 | Ishikawa | 348/208.1 |
| 2005/0254805 A1 * | 11/2005 | Moriya et al. | 396/53 |
| 2009/0160948 A1 * | 6/2009 | Tabuchi | 348/208.2 |
| 2009/0160953 A1 * | 6/2009 | Nagata et al. | 348/208.6 |
| 2010/0002088 A1 | 1/2010 | Ohta | 348/208.7 |

FOREIGN PATENT DOCUMENTS

| | | |
|---|---|---|
| EP | 0 587 432 | 3/1994 |
| JP | 6-98246 | 4/1994 |
| JP | 6-165020 | 6/1994 |

* cited by examiner

*Primary Examiner* — Nicholas Giles
(74) *Attorney, Agent, or Firm* — Allen, Dyer, Doppelt, Milbrath & Gilchrist, P.A.

(57) ABSTRACT

An optical image stabilization (OIS) system may be used in a camera having an optical system which includes a motion compensating optical element driven by an actuator. The system may include a motion sensor providing a motion signal, a frequency detector for detecting a dominant frequency being that frequency within the motion signal which may produce the most significant motion blurring in the image produced by the camera, and a tunable high-pass filter for filtering the motion signal and supplying the filtered motion signal as an actuator control signal. The tunable high pass filter may be tuned based upon the dominant frequency to a filter characteristic which provides a phase lead substantially canceling a phase lag of the actuator at that frequency.

21 Claims, 3 Drawing Sheets

Camera Motion

OPTICAL IMAGE STABILIZATION

FIELD OF THE INVENTION

The present disclosure relates to optical image stabilization systems. The present disclosure may be described with particular reference to solid state cameras (either still or video), such as those used in mobile phones. However, the present disclosure is also applicable to other forms of camera, and to other optical apparatus such as image stabilized binoculars.

BACKGROUND OF THE INVENTION

Optical image stabilization systems use micro-actuators to move a lens or another optical element, or to move an entire camera with respect to a mounting, to cancel the effects of camera motion on images produced by the system. In the case of phone cameras, for instance, there are significant size constraints which can lead to the use of micro-actuators having a bandwidth which may not be sufficient to enable effective cancellation of all vibration frequencies simultaneously. This can be a problem particularly when using optical elements other than traditional glass or plastic components. For example, the Varioptic® liquid lens has characteristics of small size, simplicity and ease of control, which make it attractive for uses such as phone cameras, but it has a bandwidth of only 14 Hz.

SUMMARY OF THE INVENTION

According to an aspect, an optical image stabilization (OIS) system may be for use in a camera having an optical system including a motion compensating optical element driven by an actuator. The system may comprise a motion sensor providing a motion signal, a frequency detector for detecting a dominant frequency being that frequency within the motion signal which may produce the most significant motion blurring in the image produced by the camera, and a tunable high-pass filter for filtering the motion signal and supplying the filtered motion signal as an actuator control signal. The tunable high pass filter may be tuned depending on the dominant frequency to a filter characteristic, which provides a phase lead substantially canceling a phase lag of the actuator at that frequency.

The system may include an analog-to-digital converter (ADC) interposed between the motion sensor and the frequency detector and the high-pass filter. The frequency detector may be a Fourier transform frequency detector. The system may further comprise means or a module configured to weight the detected motion frequencies depending on exposure time such that higher frequencies are weighted more strongly as exposure time is reduced.

The present disclosure also may provide a camera comprising an optical system including a lens and an actuator for an optical stabilization element, an image sensor, and an OIS system as defined above. In another embodiment, a liquid lens may function as both the lens and the actuator.

Another aspect is directed to a method of providing optical image stabilization in a camera having an optical system including a motion compensating optical element driven by an actuator. The method may comprise determining the phase lag of the actuator at a range of frequencies, detecting camera motion, determining a dominant frequency being that frequency within the motion signal which may produce the most significant motion blurring in the image produced by the camera, and compensating for phase lag of the actuator at the dominant frequency by introducing a substantially equal and opposite phase lead in a control signal to the actuator.

The phase lead may be applied by high-pass filtering the motion signal in a tunable filter, the filter characteristic being selected in dependence on the dominant frequency. The dominant frequency may be detected by Fourier transform techniques applied to a digitized representation of a motion signal. The method may further comprise weighting the detected motion frequencies in dependence on image exposure time. Another aspect of the present disclosure is directed to a mobile phone including the camera defined above.

BRIEF DESCRIPTION OF THE DRAWINGS

An embodiment of the present disclosure may now be described, by way of example, with reference to the drawings, in which.

DETAILED DESCRIPTION OF THE PREFERRED EMBODIMENTS

Figure 1:
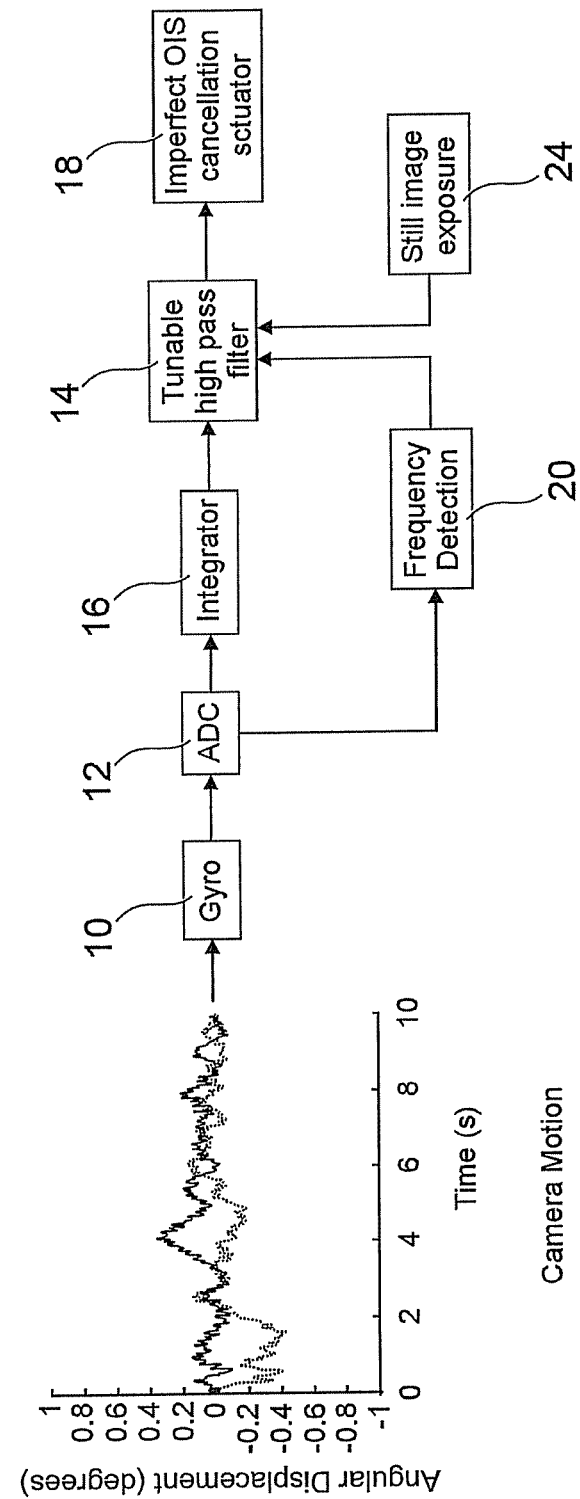
FIG. 1 is a block diagram illustrating an embodiment, according to the present disclosure.

Referring to FIG. 1, an optical image stabilization system according to the present disclosure has a gyro 10 which detects camera motion. The gyro output is digitized by an analog-to-digital converter 12. The digitized signal is passed through a tunable high-pass filter 14, and the resultant signal drives an actuator 18. One suitable form of filter 14 is a Butterworth filter. An integrator 16 may optionally be interposed between the ADC 12 and the filter 14.

The output of the ADC 12 is also passed to a frequency detector 20, which produces a control signal 22 for controlling the tuning of the high-pass filter 14. The frequency detector 20 has the function of analyzing the frequency content of the camera motion to determine the frequency which may cause the greatest amount of blurring of the image being captured (hereinafter "the dominant frequency") by detecting the frequency component with the greatest amplitude. Optionally, the system may also include a still image exposure input 24, discussed further below, to produce a more sophisticated correction. Once the frequency detector 20 has determined the frequency which may cause the greatest amount of blurring, the filter 14 is tuned by the control signal 22 to optimize the control of the actuator 18.

Figure 2:
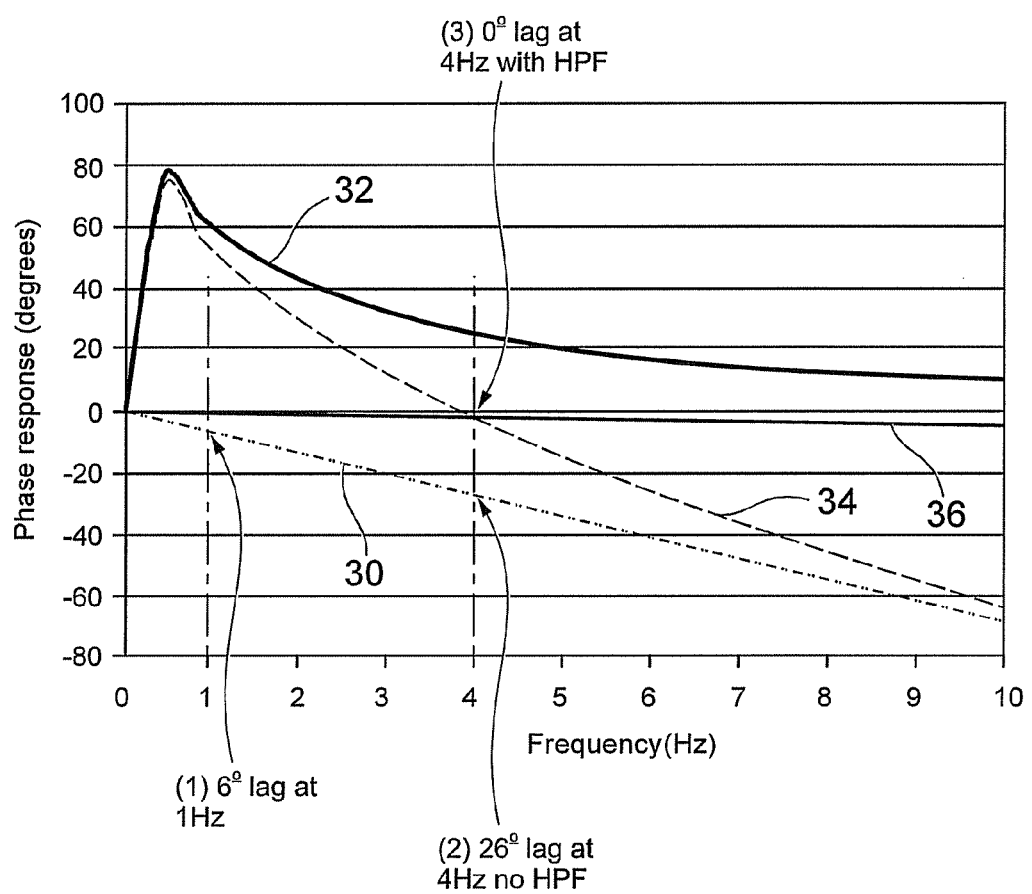
FIG. 2 is a plot of phase response against frequency in an embodiment of the system, according to the present disclosure.

Consider FIG. 2 for the case where 4 Hz is calculated as being the camera motion which may cause the most image blurring for a given still image. In FIG. 2, the curve 30 represents the frequency response of the actuator 18. It may be seen that at 4 Hz, the actuator 18 has a phase lag of 26°. Curve 32 represents the frequency response of the high-pass filter 14; the slope of the response curve 32 can be varied by tuning the filter 14, and in this example by setting the filter coefficient to 0.987 the filter is set to have a phase lead of 26° at 4 Hz. Thus, the overall system response is as shown by the curve 34, and the phase lag of the system at 4 Hz is zero. When the phase lag is zero at a given frequency, the tracking of that frequency may be optimal.

The motion sensor gyro 10 may also introduce a small degree of frequency dependent phase lag, as indicated by curve 36. The system can be programmed to account for this when tuning the high pass filter 14. Thus, the system cancels the phase lag of the actuator by making use of the phase lead of the high-pass filter, and does so at the frequency which is detected as being most critical.

The frequency detector 20 suitably applies a Fourier transform to the digitized motion signal to provide the dominant frequency by detecting the frequency component producing the greatest amplitude of motion. Digital implementation of Fourier transforms is known in the art and need not be described here. Other known forms of frequency analysis may also be used.

The actuator 18 may be a conventional electro-mechanical actuator producing linear motion of an optical element, for example, a voice coil motor coupled to a lens. In one embodiment of the present disclosure, however, the actuator and optical element are combined in the form of an electrically-alterable lens such as a liquid lens.

The still image exposure input 24 receives the magnitude of the exposure requested by the camera, which can be used to further modify the filter characteristic by weighting the detected motion frequencies. For a given amplitude of motion, short exposures may be more affected by high than low frequencies, while for longer exposures lower frequencies may be more significant.

Figure 3:
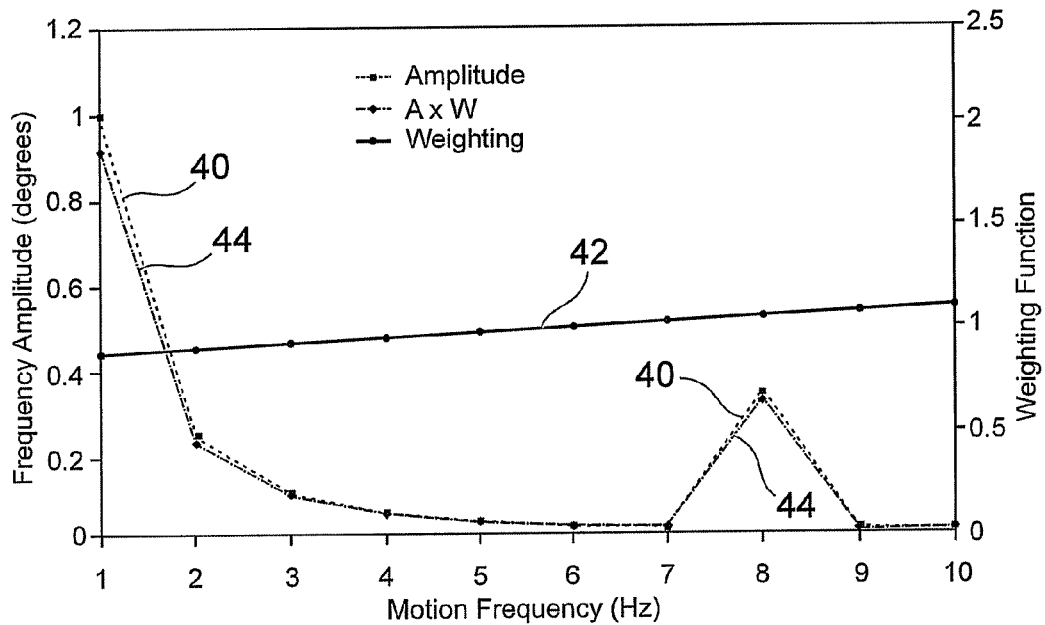
FIG. 3 is a plot of amplitude against motion frequency for a long exposure in an embodiment of the system, according to the present disclosure.
Figure 4:
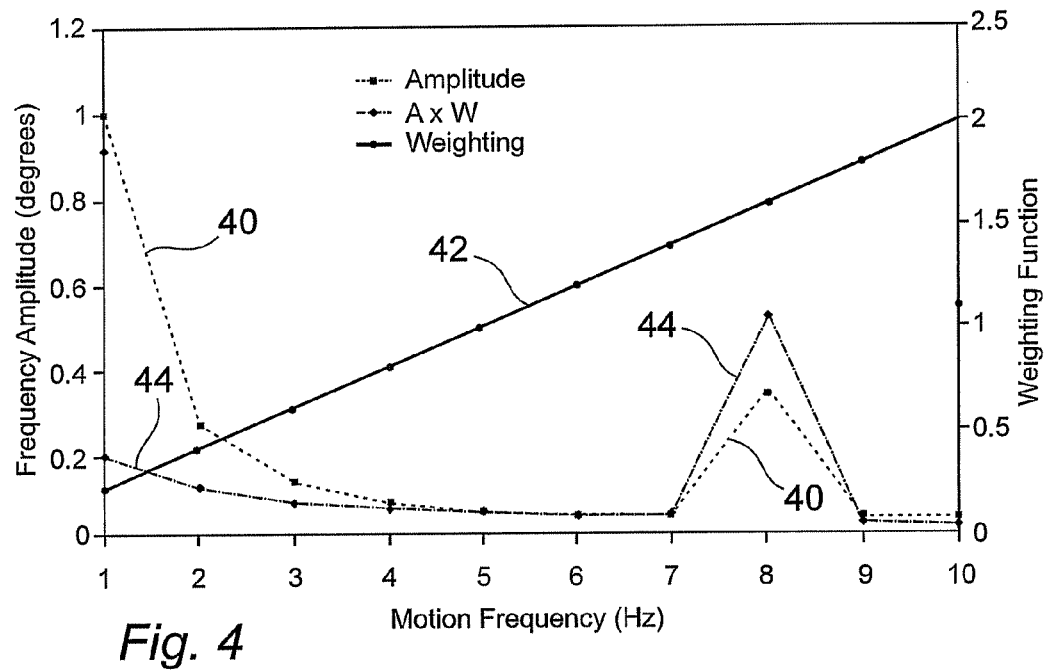
FIG. 4 is a plot of amplitude against motion frequency for a short exposure in an embodiment of the system, according to the present disclosure.

In FIG. 3, curve 40 shows typical values of amplitude against frequency for a long exposure of 1 second. In FIG. 4, curve 40 shows typical values of amplitude against frequency for a short exposure of 100 ms. It can be seen that maximum motion detected occurs at 1 Hz, and there is also a smaller peak at 8 Hz. When operating without an exposure input, the high pass filter would be tuned to compensate at 1 Hz for both long and short exposures.

However, short exposures are more strongly affected by high frequency motion than by low frequency motion. Therefore, in a shorter exposure more weight should be given to higher frequencies. Accordingly as seen in FIGS. 3 and 4, a frequency-dependent weighting function 42 is applied to the amplitude signal to give a resultant signal 44 used to control the tuning of the high pass filter. The gradient of the weighting function 42 is increased as the exposure time is shortened. Thus 1 Hz would be selected as the dominant frequency in FIG. 3, but in FIG. 4, 8 Hz would predominate.

The ADC 12, frequency detector 20 and filter 14 can be readily implemented within the signal processing circuitry of a solid state camera such as a single chip CMOS device. The present disclosure thus provides the possibility of optical image stabilization within the extremely limited package size of single chip cameras such as those used in mobile phones. The present disclosure is also particularly suited for use with liquid lenses.

That which is claimed is:

1. An optical image stabilization system for a camera having an optical system including an actuator and a motion compensating optical element driven by the actuator, the system comprising:
    a motion sensor configured to provide a motion signal;
    a frequency detector configured to detect a dominant frequency, the dominant frequency being a frequency of the motion signal producing a threshold amount of motion blurring in an image produced by the camera;
    a tunable high-pass filter configured to filter the motion signal and to supply the filtered motion signal as an actuator control signal; and
    a module configured to weight detected motion frequencies based upon an exposure time, higher frequencies being weighted inversely to the exposure time;
    said tunable high pass filter being configured to be tuned based upon the dominant frequency and to provide a phase lead substantially canceling a phase lag of the actuator at the dominant frequency.

2. The system according to claim 1 wherein the threshold amount of motion blurring is a maximum amount of motion blurring.

3. The system according to claim 1 further comprising an analog-to-digital converter (ADC) between said motion sensor and said tunable high-pass filter.

4. The system according to claim 1 wherein said frequency detector comprises a Fourier transform frequency detector.

5. The system according to claim 3 further comprising an integrator coupled between said ADC and said tunable high-pass filter.

6. An optical image stabilization system for a camera having an optical system including an actuator and a motion compensating optical element driven by the actuator, the system comprising:
    a motion sensor configured to provide a motion signal;
    a Fourier transform frequency detector configured to detect a dominant frequency, the dominant frequency being a frequency of the motion signal producing a threshold amount of motion blurring in an image produced by the camera;
    a tunable high-pass filter configured to filter the motion signal and to supply the filtered motion signal as an actuator control signal;
    a module configured to weight detected motion frequencies based upon an exposure time; and
    an analog-to-digital converter (ADC) between said motion sensor, said Fourier transform frequency detector, and said tunable high-pass filter;
    said tunable high pass filter being configured to be tuned based upon the dominant frequency and to provide a phase lead substantially canceling a phase lag of the actuator at the dominant frequency.

7. The system according to claim 6 further comprising an integrator coupled between said ADC and said tunable high-pass filter.

8. A camera comprising:
    an optical system including a lens, an optical stabilization element, and an actuator for said optical stabilization element;
    an image sensor coupled to said optical system; and
    an optical image stabilization system comprising
        a motion sensor configured to provide a motion signal,
        a frequency detector configured to detect a dominant frequency, the dominant frequency being a frequency of the motion signal producing a threshold amount of motion blurring in an image produced by said optical system, and
        a tunable high-pass filter configured to filter the motion signal and to supply the filtered motion signal as an actuator control signal,
        said tunable high pass filter being configured to be tuned based upon the dominant frequency and to provide a phase lead substantially canceling a phase lag of the actuator at the dominant frequency.

9. The camera according to claim 8 wherein the lens and the actuator are provided via liquid lens functions.

10. The camera according to claim 8 wherein said optical image stabilization system further comprises an analog-to-digital converter (ADC) between said motion sensor and said tunable high-pass filter.

11. The camera according to claim 8 wherein said frequency detector comprises a Fourier transform frequency detector.

12. The camera according to claim 8 wherein said optical image stabilization system further comprises a module configured to weight detected motion frequencies based upon an exposure time; and wherein higher frequencies are weighted inversely to exposure time.

13. The camera according to claim 10 wherein said optical image stabilization system further comprises an integrator coupled between said ADC and said tunable high-pass filter.

14. A mobile phone comprising:
a camera comprising
an optical system including a lens, an optical stabilization element, and an actuator for said optical stabilization element;
an image sensor coupled to said optical system; and
an optical image stabilization system comprising
a motion sensor configured to provide a motion signal,
a frequency detector configured to detect a dominant frequency, the dominant frequency being a frequency of the motion signal producing a threshold amount of motion blurring in an image produced by the camera, and
a tunable high-pass filter configured to filter the motion signal and to supply the filtered motion signal as an actuator control signal,
said tunable high pass filter being configured to be tuned based upon the dominant frequency and to provide a phase lead substantially canceling a phase lag of the actuator at the dominant frequency.

15. The mobile phone according to claim 14 wherein the lens and the actuator are provided via liquid lens functions.

16. The mobile phone according to claim 14 wherein said optical image stabilization system further comprises an analog-to-digital converter (ADC) between said motion sensor and said tunable high-pass filter.

17. The mobile phone according to claim 14 wherein said frequency detector comprises a Fourier transform frequency detector.

18. A method of providing optical image stabilization in a camera having an optical system including a motion compensating optical element driven by an actuator, the method comprising:
determining a phase lag of the actuator at a range of frequencies;
detecting camera motion;
determining a dominant frequency, the dominant frequency being a frequency of a motion signal producing a threshold amount of motion blurring in an image produced by the camera;
compensating for the phase lag of the actuator at the dominant frequency by introducing a substantially equal and opposite phase lead into a control signal to the actuator; and
weighting detected motion frequencies based upon an image exposure time.

19. The method according to claim 18 wherein the threshold amount of motion blurring is a maximum amount of motion blurring.

20. The method according to claim 18 further comprising applying the phase lead by high-pass filtering the motion signal in a tunable filter with a filter characteristic being selected based upon the dominant frequency.

21. The method according to claim 18 further comprising detecting the dominant frequency with Fourier transform techniques applied to a digitized representation of the motion signal.

* * * * *